United States Patent [19]

Lazarus

[11] Patent Number: 4,503,879
[45] Date of Patent: Mar. 12, 1985

[54] PLUG MECHANISM FOR WELLHEAD TOOL

[75] Inventor: Kenneth W. Lazarus, Shreveport, La.

[73] Assignee: Joy Manufacturing Company, Pittsburgh, Pa.

[21] Appl. No.: 548,606

[22] Filed: Nov. 4, 1983

[51] Int. Cl.³ .................. F16L 55/12; F16K 43/00
[52] U.S. Cl. ................................. 137/315; 138/89; 138/94; 408/83.5
[58] Field of Search ............... 137/315, 318; 138/89, 138/94; 408/99, 100, 110, 111, 136, 83.5

[56] References Cited

U.S. PATENT DOCUMENTS

| | | | |
|---|---|---|---|
| 1,997,878 | 4/1935 | Wagner | 138/89 |
| 2,911,859 | 11/1959 | Longley et al. | 137/318 |
| 3,275,023 | 9/1966 | Raspante | 137/315 |
| 3,473,555 | 10/1969 | Martin et al. | 137/315 |
| 4,019,541 | 4/1977 | Koppl | 138/94 |
| 4,073,466 | 2/1978 | Snyder | 137/625.66 |
| 4,184,504 | 1/1980 | Carmichael et al. | 137/15 |

*Primary Examiner*—George L. Walton
*Attorney, Agent, or Firm*—Marvin J. Marnock; David A. Warmbold

[57] ABSTRACT

An improved plug mechanism for use with a wellhead tool for removing and replacing valves on an operating wellhead under pressure including an elongated housing with a fluid coupling on one end for connecting to the outlet end of a wellhead valve and a plug mechanism extending from the housing through the valve into the wellhead where it seals fluid flow to the valve. The plug mechanism includes an expandable sealing element and an improved latch mechanism including a plurality of ball bearings which are extendable and retractable from the plug mechanism to secure it solidly within the bore of the wellhead upstream of the valve to be removed. The housing is equipped with an operating mechanism to expand and retract the sealing member and to engage and release the ball bearings. The plug mechanism further includes an improved self-alignment feature to ease attachment of the operating mechanism to the plug mechanism once the plug mechanism has been secured within the bore of the wellhead.

9 Claims, 4 Drawing Figures

PLUG MECHANISM FOR WELLHEAD TOOL

BACKGROUND OF THE INVENTION

This invention relates generally to tools used for removing and replacing valves attached to a wellhead under pressure without shutting in the well; and, more particularly, to improvements in a plug mechanism for use with the tool which may be releasably locked within and sealed with respect to a bore of the wellhead.

The improved plug mechanism of this invention is designed for use on wellhead assemblies to remove and replace wing valves from the side of the casing bowl or spool assemblies. Several devices are known in the art for removing such valves and the like from a wellhead assembly; one such device is shown in U.S. Pat. No. 4,019,541 issued Apr. 26, 1977 to L. Koppl. This patent discloses a wellhead tool capable of placing a plug in a bore of a specially designed T-fitting upstream of the valve to be removed. The use of this tool and plug apparatus is obviously limited to use on new equipment in a system utilizing the same manufacturer's T-fitting, however, it is desirable to have a plug mechanism that can be used in existing and new equipment utilizing universal T-fitting and wellhead designs.

Another such device is shown in U.S. Pat. No. 4,184,504 issued Jan. 22, 1980 to Carmichael et al, and assigned to the same assignee as the present invention, which shows a similar tool and plug arrangement as the present invention. This device utilizes a plug mechanism which is placed in a smooth bore T-fitting upstream of the valve to be removed. The plug mechanism is secured within the bore by use of a plurality of radially movable and pivotally mounted latch members which lock onto the sides of the transverse intersecting bore of the wellhead. However, due to the small diameter bore sizes typically used on side outlets of wellheads (e.g. 3 inches), the diameter of the plug mechanism must be small enough to fit therein and the pivotally mounted latch members can not be economically constructed of material strong enough to withstand the high pressures (up to 30,000 pounds per square inch) and high temperatures (up to 1,500 degrees F.) which are encountered in a wellhead assembly.

It is therefore a primary object of this invention to provide an improved plug mechanism for use with a wellhead for removing and replacing valves on an operating wellhead which overcomes the aforementioned disadvantages of the prior art devices.

It is a further object of the invention to provide an improved plug mechanism having a positive acting latch means to securely lock the plug mechanism within the bore of the T-fitting upstream of the valve to be removed and which can withstand the extremely high wellhead pressures existing therein without deformation of the mechanical parts of the plug mechanism.

It is a further object of the invention to provide a tool and plug mechanism that are usable in smooth bore T-fittings presently used in oil field type and geothermal type wellhead assemblies.

Still, a further object of the invention is to provide a tool for removing and replacing valves on a wellhead assembly wherein the tool has a powerable piston and cylinder arrangement on an operating mechanism that inserts and actuates a plug mechanism having a packing and latching assembly for sealing the bore and fluid flow to the valve to be removed.

Various other objects, advantages and features of the invention will become apparent to those skilled in the art upon examination of the following description of a preferred embodiment of the invention and the accompanying drawings.

SUMMARY OF THE INVENTION

The present invention is directed to an improved plug mechanism for use with a wellhead tool for removing and replacing wing valves or the like from an operating wellhead. The tool has an elongated housing with a fluid coupling on one end which is mountable with the fluid coupling of the valve to be removed. An extendable operating mechanism is positioned through the housing and is operable to exit at the fluid coupling. The plug mechanism is releasably mountable with the operating mechanism and can be inserted through the valve to be removed into the bore of the wellhead upstream of the valve. A plurality of outwardly movable ball bearings are provided with the plug mechanism and can be extended amd retracted into the bore of a wellhead spool or bowl by rotation of a threaded activating member engaged by the operating mechanism to secure the plug mechanism within the bore of the wellhead in opposition to pressurized fluid in the wellhead. A sealing element is provided with the plug mechanism and it is expandable to temporarily block fluid flow through the bore of the wellhead upon further rotation of the operating mechanism engaging the actuating member which compresses the sealing element between two portions of the plug mechanism. The bore of the wellhead downstream of the plug mechanism including the valve to be removed are now isolated from the fluid pressure existing in the wellhead. The operating mechanism of the tool is releasable from the plug mechanism and is retractable into its housing so that the valve may be removed from the wellhead for repairs or replacement.

BRIEF DESCRIPTION OF THE DRAWINGS

So that the manner in which the above recited features, advantages and objects of the present invention, as well as others, which will become apparent, are attained and can be understood in detail, a more particular description of the invention, briefly summarized above, may be had by reference to the preferred embodiment thereof which is illustrated in the appended drawings, which drawings form a part of this specification. it is to be noted, however, that the appended drawings illustrate only the best mode contemplated by the inventor of carrying out the invention and are, therefore, not to be considered limiting of its scope, for the invention may admit to other equally effective embodiments, wherein.

DESCRIPTION OF THE PREFERRED EMBODIMENT

Figures 1, 4:
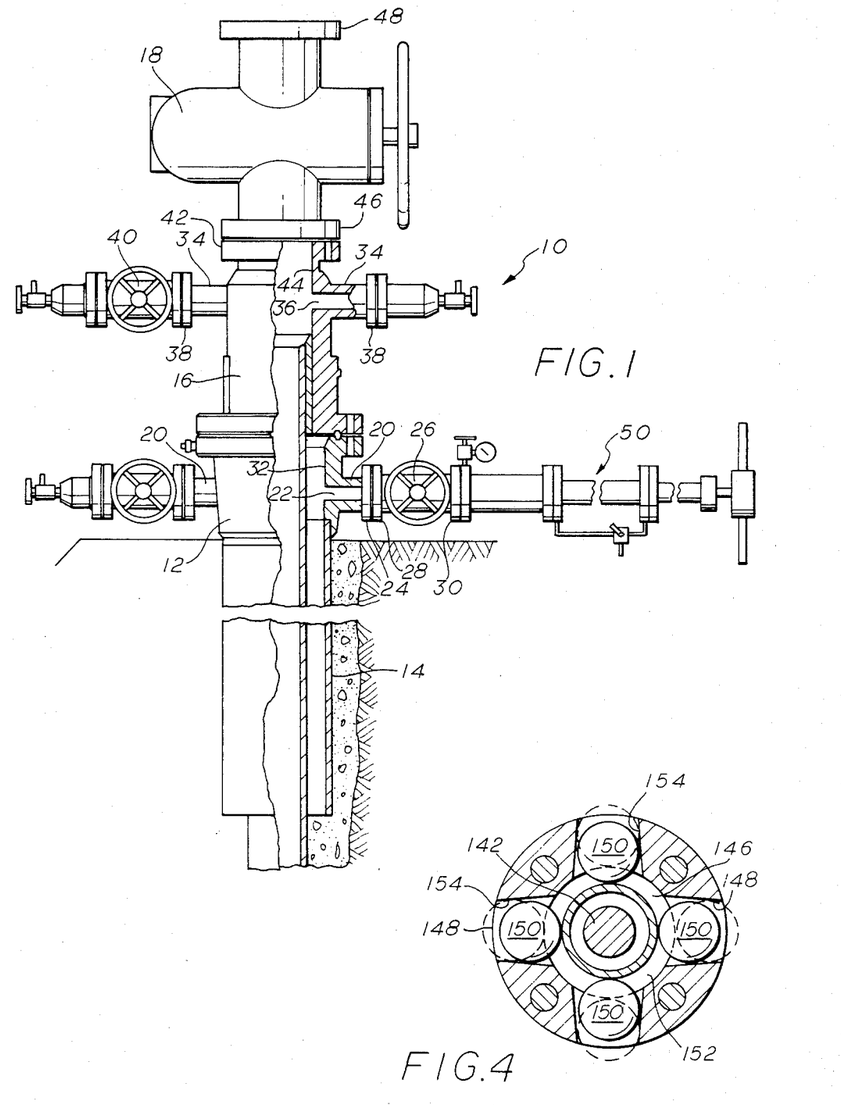
FIG. 1 is an elevation view of a wellhead assembly and the upper portion of the well casing which extends through the ground with portions of the wellhead assembly removed for clarity wherein the tool of the preferred embodiment is shown mounted on a wing valve at the casing head bowl.
FIG. 4 is an end cross-sectional elevation view of the plug mechanism taken from the position of line 4—4 of FIG. 3.

Referring to FIG. 1 of the drawings there is shown the wellhead tool of this invention mounted on an operative wellhead assembly indicated generally at 10. Wellhead assembly 10 has a bowl 12 which is secured to the well casing 14 that extends through the ground. A spool 16 is mounted on top of the bowl and a master valve 18 is mounted on top of the spool. Wellhead bowl 12 is provided with auxiliary outlets on the sides thereof. Each of the auxiliary outlets are formed by a wing valve conduit 200 having a bore 22 extending outwardly from the bowl and having a fluid coupling flange 24 on the outer end thereof for mounting a wing valve 26. Wing valve 26 is provided with fluid coupling flanges 28 and 30 on the inlet and outlet thereof for mounting with wing valve conduit flange 24 on bowl 12 and connecting with other portions of the wellhead system. The interior of bowl 12 is provided with a relatively smooth and cross-sectionally circular interior surface 32 which is roughly perpendicular to the bore 22. Spool 16 also has a pair of auxiliary outlets with each outlet having a conduit 34 with bore 36 and an attached outlet flange 38 for mounting spool outlet valves 40 or other equipment. The upper portion of spool 16 has an outlet flange 42 for connection with master valve 18. The interior of spool 16 has a cylindrical bore 44 which is intersected by the bores 36 of the two spool auxiliary outlet conduits 34. Master valve 18 is provided with inlet and outlet flanges 46 and 48 with the inlet flange connected to the spool outlet flange 42. Master valve outlet flange 48 is connected to a second master valve in some installations and in other installations it joins other portions of the wellhead completion system.

The wellhead assembly 10 is shown in FIG. 1 with the wellhead tool of this invention mounted on the outlet flange 30 of wing valve 26 located on bowl 12. The tool, indicated generally at 50, is shown in greater detail in FIG. 2, and includes a housing having an elongated cylindrical portion 52 enclosing a portion of an operating mechanism which is indicated generally at 54 and an attached enlarged housing portion 56. Enlarged housing portion 56 forms an enclosure for a plug mechanism, indicated generally at 58, which is releasably connected to the end of the operating mechanism 54. The operating mechanism 54 extends through housing portion 52 and can be positioned to extend through enlarged housing portion 56. Housing portion 52 is an elongated tubular member with flanges 60 and 62 on the opposite ends thereof. A housing end member 64 is mounted on the outer end of housing portion 52 and is secured to flange 60. Enlarged housing portion 56 is also an elongated generally cylindrical member having a flange 66 on its outer end to mount with flange 62 of cylindrical housing portion 52. The inner end of enlarged housing portion 56 is provided with a flanged coupling 68 of the type compatible with typical flange couplings on wellhead valves. Flange 68 has a passageway 70 through one side thereof for mounting a relief valve 72 and a pressure gauge 74. Operating mechanism 54 includes a cylindrical outer member 76 which encloses a major portion of a rodlike inner member 78.

Figure 2:
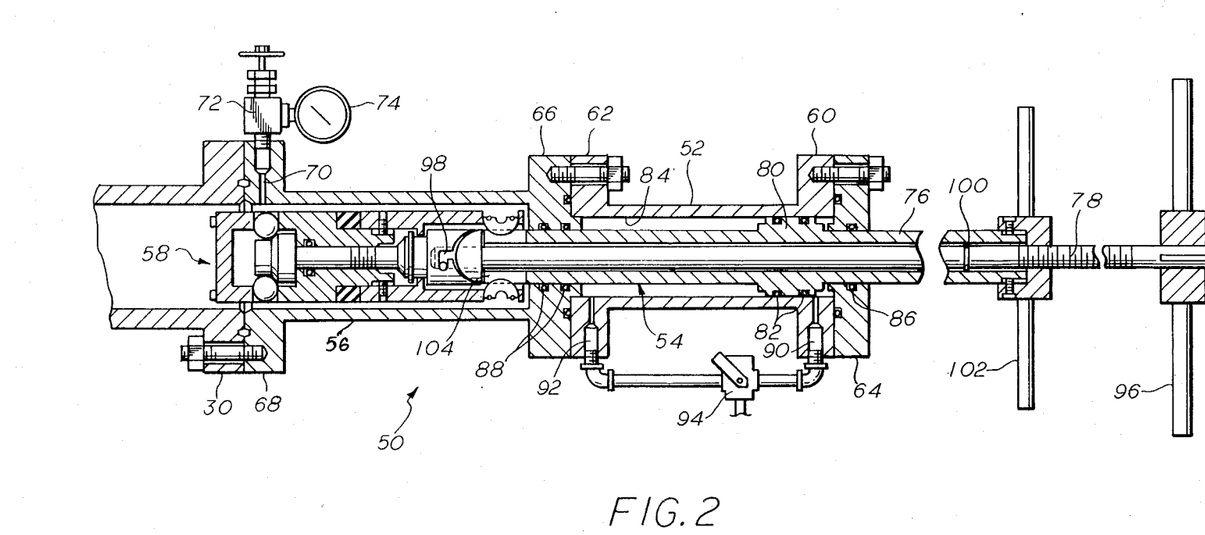
FIG. 2 is a cutaway elevation view of the wellhead tool of this invention with the operating mechanism and plug mechanism in the retracted position within the tool housing and mounted on the fluid coupling of a wing valve on a wellhead assembly.

The outer member 76 of the operating mechanism 54 has an enlarged piston portion 80 on a mid-portion thereof.

Piston 80 is located inside housing portion 52 and is provided with a pair of seals 82 around the outer perimeter thereof which seal in the bore 84 of housing portion 52. A pair of seals 86 and 88 are provided in flanges 64 and 66, respectively, to seal opposite ends of the cylinder formed by housing portion 52. Flanges 60 and 62 are provided with passageways 90 and 92, respectively, through one side thereof to supply fluid under pressure to opposite ends of piston 80 in housing portion 52. A three-way fluid control valve 94 is connected by conduits to passageways 90 and 92. The control valve 94 is connected to a fluid pressure source so that fluid under pressure can be directed to either side of piston 80 to move the operating mechanism 54 between its extended and retracted positions.

The operating mechanism 54 is movable between a retracted position shown in FIG. 2 and an extended position wherein the piston 80 travels to the other side of the housing portion 52. Both the inner and outer rodlike members 78 and 76, respectively, and the plug mechanism 58 which is connected to the end of the operating mechanism 54 travel a corresponding longitudinal distance inwardly toward the wellhead assembly 10 so that the plug mechanism can be positioned through the wing valve 26 into the bore 22 of the wellhead conduit 20. The outer end portion of the inner operating member 78 has an operating handle 96 thereon and is mounted within the outer operating member 76. A pin 98 is mounted transversely through the inner end of inner operating member 78 and extends outwardly from both sides thereof for engagement with the plug mechanism 58. A peripheral seal 100 around a mid-portion of the inner operating member 78 provides a fluid-tight seal between the inner and outer operating members 78 and 76. Outer operating member 76 has an operating handle 102 on the outer end thereof and a pair of longitudinally oriented slots 104 on the inner end thereof. Slots 104 are disposed longitudinally on opposite sides of the member for engagement with the plug mechanism 58.

Figure 3:
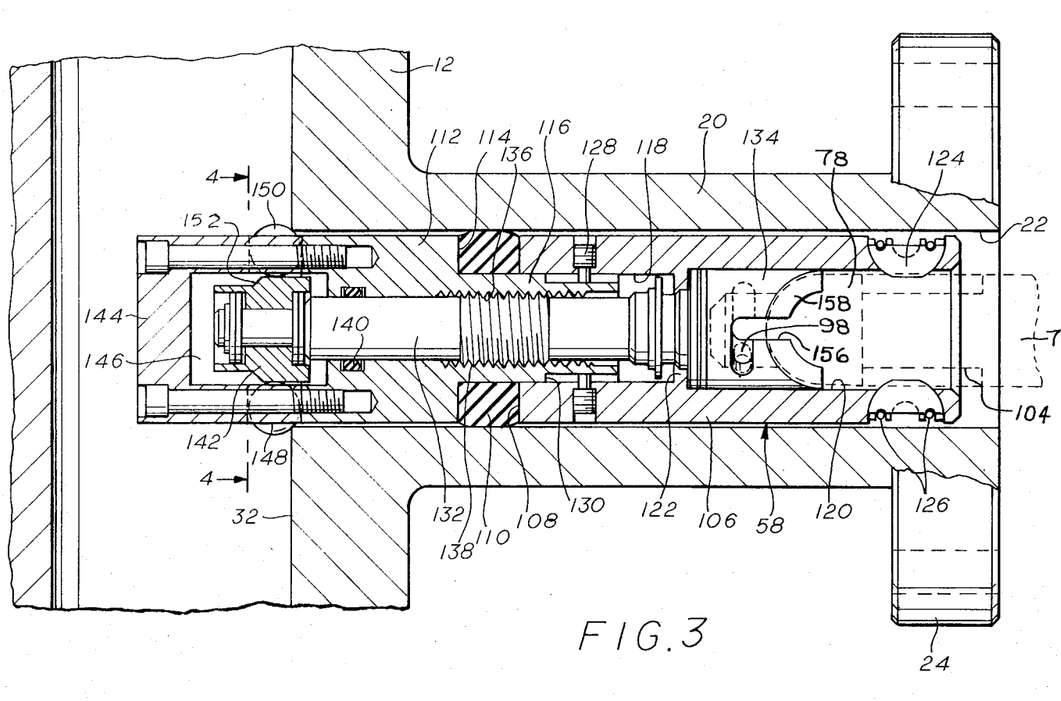
FIG. 3 is an enlarged cross-sectional elevation view of the plug mechanism secured within the bore of the wellhead with the ball bearings in the extended position and the sealing element compressed sufficiently to engage the walls of the bore.

Now, referring to FIG. 3, wherein the plug mechanism of the present invention is shown in greater detail, the plug mechanism 58 includes a generally cylindrical body member 106 with a longitudinal bore therethrough and a peripheral abutment 108 at one end thereof, an annular sealing element 110 adjacent the body member abutment 108, and a generally cylindrical seal retaining member 112 with a longitudinal bore therethrough. The seal retaining member 112 includes a peripheral abutment 114 adjacent and facing the other side of sealing element 110 and an extension portion 116 which extends longitudinally through the annulus of sealing element 110 into the bore of body member 106. The bore of body member 106 is provided with a small diameter bore portion 118 at one end which receives the seal retaining member extension portion 116, a large diameter bore portion 120 at its other end and an inwardly extending radial shoulder 122 intermediate bore portions 118 and 120. The large diameter bore portion 120 is provided with a pair of diametrically opposed locking keys 124 extending through the outer periphery of body member 106 into the large diameter bore portion 120. The locking keys 122 are held in position by a pair of springs 126 wrapped around the outer periphery of body member 106 so that upon an outwardly radial force the keys 122 will be displaced away from the bore portion 120. A plurality of set screws 128 are provided in the outer periphery of body member 106 which extend into the small diameter bore portion 118 wherein the set screws 128 engage longitudinal slots 130 formed on the seal retaining member 112 to prevent relative rotation between the body member 106 and seal retaining member 112. An elongated threaded actuating shaft 132 extends through the bore of body member 106 and has an enlarged head 134 on a first end thereof positioned in the large diameter bore portion 120 of the body member with one side thereof resting on shoulder 122. The actuating shaft 132 is longitudinally fixed with respect to the body member 106. The bore of the seal retaining member 112 is internally threaded at 136 for connection with actuating shaft 132 and actuating shaft 132 is externally threaded at 138 on a mid-portion thereof for engagement with the internally threaded seal retaining member 112. An annular seal 140 is provided in the bore of seal retaining member 112 to seal around activating shaft 132.

The second end of activating shaft 132 is provided with a latch displacing member 142 affixed thereto for activating the latching mechanism of the present invention. A generally cup-shaped end cap 144 is received on the end of seal retaining member 112 enclosing the second end of activating shaft 132 and latch displacing member 142 and forming a latch chamber 146 therein. The end cap 144 has a plurality of slots 148 therein adjacent the end of the seal retaining member 112 communicating between the latch chamber 146 and exteriorly of the plug mechanism 58 as shown in FIG. 4. A plurality of ball bearings 150, one for each slot 148, are positioned within the latch chamber 146. The latch displacing member 142 is provided with a frusto-conical shoulder 152 such that upon actuation of the latch displacing member 142 the shoulder 152 contacts and radially displaces ball bearings 150 into slots 148. Slots 148 have interior walls 154 which are divergently angled toward the central longitudinal axis of the plug mechanism so that ball bearings 150 may enter the slots 148 from the latch chamber 146 but are unable to completely exit slots 148 exteriorly of plug mechanism. As shown in FIGS. 3 and 4, only a portion of the ball bearings 150 extend beyond the circumference of the plug mechanism 58 to engage the interior surface 32 of wellhead bowl 12 when the plug mechanism 58 is secured within conduit 20.

As the activating shaft 132 is rotated the seal retaining member 112 and end cap 144 are displaced towards the body member 106. The shoulder 152 of latch displacing member 142 forces the ball bearings 150 into slots 148 thereby displacing them outwardly relative to the longitudinal axis of the plug mechanism. As this occurs when the plug mechanism is positioned in the wellhead as shown in FIG. 3, it causes ball bearings 150 to extend beyond the circumference of the plug mechanism and to be displaced over the portion of surface 32 which is immediately adjacent bore 22 of conduit 20. Thus, the ball bearings 150 secure the plug mechanism 58 within the bore 22 of conduit 20 in wellhead bowl 12.

The enlarged head 134 of activating shaft 132 is shaped to receive and engage the operating mechanism 54 of the tool. The enlarged head 134 is generally cup-shaped with the hollow center portion facing the direction of the operating mechanism 54 and is provided with a pair of oppositely extending L-shaped slots 156 on opposing sides thereof as shown in FIGS. 2 and 3. Furthermore, the open end of enlarged head 134 includes a self-aligning feature to provide easy connection with the end portion of inner operating member 78. The self-aligning feature is a generally saddle-shaped end portion formed by intersecting the open end portion of the enlarged head 134 with converging beveled planes as indicated at 158. The pin 98 on inner operating member 78 first contacts the beveled planes 158 which directs the pin 98 into the L-shaped slots 156 providing positive alignment between the operating and plug mechanisms. The pin 98 is rotated within slots 156 to engage the inner operating member 78 with the opposite slots 156 of enlarged head 134 such that the rodlike portion of inner operating member 78 is resting in the hollow end portion of the enlarged head 134. In this manner, the operating mechanism is solidly connected to the plug mechanism.

OPERATION OF THE PREFERRED EMBODIMENT

The operation of the wing valve tool and plug mechanism of the present invention is substantially the same as shown in U.S. Pat. No. 4,184,504 to Carmichael et al, the entire disclosure of which is incorporated by this reference. Therefore, only a brief description will be outlined herein. In operation, the tool with attached plug mechanism is mounted with one of the wing valves 26 as shown in FIG. 1 with tool flange 68 being secured to valve outlet flange 30. Initially wing valve 26 has the valve member thereof in the closed position so that fluid flow is blocked through the valve. To begin using tool 50 the valve member is moved to open position so that plug mechanism 58 can be inserted through the bore of the valve and into the wing valve conduit of the wellhead. Inserting plug mechanism 58 through the wing valve is done by positioning control valve 94 to apply fluid pressure to the outer side of piston 80 relative to wellhead 10 and vent the inner side of the piston so that the operating mechanism and plug mechanism 58 are displaced through the valve. When the plug mechanism 58 reaches the approximate position shown in FIG. 3, then the outer operating member handle 102 is manually held in a fixed position while handle 96 is rotated. Rotating handle 96 which rotates the inner operating member 78 rotates activating shaft 132 which displaces the seal retaining member 112 and end cap 144 towards the body member 106, thereby causing ball bearings 150 to be displaced radially outwardly to engage the inside surface 32 of bowl 12. Upon further rotation of activating shaft 132, the seal retaining member 112 continues to move toward the body member 106 and sealing element 110 is compressed between abutments 108 and 114 thereby radially outwardly expanding the sealing element 110 into fluid-tight sealing engagement with the bore 22 of wing valve conduit 20. The ball bearings 150 are actuated into engagement with wellhead 10 upon very little rotation of activating shaft 132 while the sealing element 110 may require additional turns of shaft 132 to completely seal off bore 22. Once the seal in wing valve conduit 20 has been established, the tool 50 and wing valve 26 can be removed together from flange 24. In order to release the operating mechanism 54 from the plug mechanism 58 the handle 96 of inner operating member 78 is rotated such that pin 98 can be removed from L-shaped slots 156 in the enlarged head 134 of activating shaft 132. When this is done, the operating mechanism 54 can be retracted from the position shown in FIG. 3 so the valve and tool can be easily removed from the wing valve conduit without disturbing the sealed plug mechanism.

Installing a replacement valve on the wellhead is done after the old or used wing valve has been removed from the wing valve tool. The replacement valve is attached to the tool in the same fashion as the other valve which was previously removed from the tool. It is not necessary to keep handles 96 and 102 in any relative position because the self-aligning feature 158 of enlarged head 134 and the expandable locking keys 122 of body member 106 provide easy alignment and attachment between the inner and outer operating members 78 and 76 and plug mechanism 58. Once the replacement valve flange has been connected to wellhead flange 24 and the operating mechanism is engaged with the plug mechanism, then the handle 96 of inner operating member 78 is rotated to cause the release of sealing element 110 and retraction of ball bearings 150. At this point, it may be necessary to hold handle 102 of outer operating member 76 in a fixed position while turning handle 96 of inner operating member so that the interaction between slots 104 and locking keys 122 will hold body member 106 of the plug mechanism 58 fixed while allowing the seal retaining member 112 to move away from body member 106 to completely release sealing element 110 and retract ball bearings 150 into the latch chamber 146 of the plug mechanism 58. Pressure gauge 74 on the tool will provide an indication of when the sealing element 110 has released the fluid-tight seal because pressure in the tool housing will increase. Once the ball bearings 150 are in the fully retracted position as shown in FIG. 2, the operating mechanism 54 can be retracted by applying fluid pressure to the side of piston 80 that is closest to the wellhead. When the plug mechanism 58 has been retracted to the position shown in FIG. 2, then the replacement valve can be closed to seal the fluid in the wellhead. When the replacement valve is closed, the valve removal tool can be detached from the replacement wing valve to complete the replacement procedure. Once the valve removal tool has been removed from the wing valve, then the wing valve can be reconnected to the wellhead flowline system as it was before the original valve was removed.

It is to be understood that the foregoing description of a preferred embodiment of the invention has been presented for purposes of illustration and description and is not intended to limit the invention to the precise form disclosed. For example, the tool is shown in use removing a wing valve, however, the positive latch mechanism disclosed as well as the self-aligning connection features can be utilized on tools for removing any size or type of valve as long as the valve allows the plug and operating mechanisms to communicate through its opening. It is to be appreciated, therefore, that changes in details of the illustrated construction may be made by those skilled in the art, within the scope of the appended claims, without departing from the spirit of the invention.

What is claimed is:

1. A tool adapted to be positioned against the outlet end of a valve on an operating wellhead assembly under pressure for removing and replacing the valve with the tool being in longitudinal alignment with the flowline in which the valve is positioned and in transverse alignment to a connecting passageway, which comprises:

the tool having an outer elongated housing carrying a plug mechanism and an operating mechanism releasably connected to the plug mechanism;

the plug mechanism adapted to be positioned in the flowline upstream of the inlet end of the valve adjacent the connecting passageway and having a plurality of outwardly movable latch members adapted to extend into the connecting passageway for holding the plug mechanism in a fixed position within the flowline upstream of the valve, the plug having a radially expanding elastomeric sealing element downstream of the latch members for engaging the inner circumference of the flowline in a fluid-tight sealing relation upstream of the inlet end of the valve to be removed;

the operating mechanism being manually operated through the housing adjacent the outlet end of the valve to be removed and operatively connected to the plug mechanism for selectively expanding the sealing element outwardly into sealing engagement with the flowline and for selectively moving the latch members outwardly into the connecting passageway for retaining the plug mechanism in fixed position within the flowline, the operating mechanism being releasable from the plug mechanism after actuation of the latch members and sealing element to permit removal of the valve;

the plug mechanism including a hollow generally cylindrical body member, a seal retaining member longitudinally slidably mounted with the body member at one end portion thereof, a threaded activating shaft longitudinally fixed inside the body member and threadably mounted with the seal retaining member, the sealing element being mounted between a peripheral abutment around the body member and a peripheral abutment around the seal retaining member, the activating shaft being operable upon rotation in one direction by the operating mechanism to move the seal retaining member toward the body member thereby longitudinally compressing and radially expanding the sealing element, the activating shaft being operable upon rotation in the opposite direction by the operating mechanism to move the seal retaining member away from the body member thereby releasing the sealing element; and the plug mechanism further including a latch displacing member mounted on the end of the activating shaft away from the body member and a generally cup-shaped end cap received on the end of the seat retaining member forming a latch chamber enclosing the latch displacing member, the end cap having a plurality of slots formed therein having interior walls divergently angled toward the central longitudinal axis of the plug mechanism, the latch members comprising a plurality of ball bearings positioned within the chamber between the end cap and latch displacing member surrounding the activating shaft and being in a free abutting engagement with the activating shaft at all times, the activating shaft being operable upon rotation in one direction by the operating mechanism to move the end cap toward the latch displacing member such that the ball bearings ride or cam along an exterior portion of the latch displacing member for radially biasing the ball bearings contained within the latch chamber into the slots of the end caps so that the ball bearings extend beyond the circumference of the plug mechanism to hold the plug mechanism in a fixed position within the flowline upstream of the valve, the ball bearings having diameters larger than the other opening of the slot such that the bearings are unable to pass completely through the slots, and the activating shaft being operable upon rotation in the opposite direction by the operating mechanism to move the end cap away from the latch displacing member thereby allowing the ball bearings extending into the slots of the end cap to recede into the chamber to permit removal of the plug mechanism from the flowline.

2. A wellhead tool for removing and replacing a valve on an operating wellhead assembly having a housing defining a pressurized chamber, a conduit mounted with the housing and in fluid communication with the pressurized chamber, a fluid coupling on the conduit, and a valve having inlet and outlet fluid couplings with one fluid coupling mounted on the conduit fluid coupling such that the valve is in fluid communication with the pressurized chamber, wherein the wellhead tool comprises:

an elongated housing having a fluid coupling on one end for engaging a fluid coupling of the valve;

a plug mechanism for mounting in the conduit to temporarily block fluid flow through said conduit;

latch means associated with the plug mechanism to temporarily secure the plug mechanism within the conduit of the wellhead assembly;

a resilient annular sealing member associated with the plug mechanism to temporarily seal off the conduit preventing communication of pressurized fluid from the wellhead to the valve to be removed;

an operating mechanism carried by the housing and removably connected to the plug mechanism to displace the plug mechanism through the valve into the conduit between the pressurized chamber of the wellhead assembly and the valve to be removed, the operating mechanism operable to expand and release the sealing members and to engage and release the latch means;

the plug mechanism having a hollow cylindrical body member with an abutment facing one end thereof, the sealing member being positioned adjacent the abutment of the body member in substantially coaxial relationship therewith, a seal retaining member longitudinally slidable into and coaxial with the one end of the body member and having an abutment facing the other side of the sealing member, and an activating shaft rotably mounted in the body member and received through the seal retaining member and operably connected thereto, the activating shaft being operably engageable by the operating mechanism and rotatable to move the seal retaining member longitudinally towards the body member so that the sealing member is compressed between the body member abutment and seal retaining member abutment to radially expand the sealing member; and the latch means having a latch displacing member mounted on the end of the activating shaft received through the seal retaining member, and a generally cup-shaped end cap received on the end of the seal retaining member, thereby, enclosing the latch displacing member and forming a latch chamber, the end cap having a plurality of slots formed therein communicating from the latch chamber to the exterior circumference of the plug mechanism, the slots having interior walls which are divergently angled toward the central longitudinal axis of the plug mechanism, the latch chamber having a plurality of ball bearings positioned in a surrounding relationship with the activating shaft and being in a free abutting engagement with the activating shaft at all times so that upon rotation of the activating shaft by the operating mechanism the latch displacing member is operable to displace the ball bearings into the slots of the end cap, such that the ball bearings ride or cam along an exterior portion of the latch displacing member between extended and retracted positions.

3. A wellhead tool as recited in claim 2, wherein:

the operating mechanism has an inner operating member and an independently rotatable outer operating member;

the inner operating member has an inner end which is engageable with the plug mechanism extending beyond an inner end of the outer operating member and has a pin transversely mounted therethrough;

the outer operating member has a pair of diametrically opposed elongated slots formed in an inner end portion thereof with the slots being disposed along the longitudinal axis of the inner operating member and opening at the inner end of the outer operating member;

the body member of the plug mechanism has a pair of diametrically opposed locking keys extending into the hollow portion thereof and secured therein by spring means surrounding the outer circumference of the body member, the locking keys being radially displacable upon insertion of the operating mechanism into the body member and the keys being engageable in the slots of the outer operating member upon rotation of the outer operating member to rotatably secure the outer operating member to the body member;

and the activating shaft has an enlarged head end portion with a central opening longitudinally oriented relative to the longitudinal axis of the operating mechanism and a pair of oppositely facing diametrically opposed generally L-shaped slots opening with the long end of the slots directed toward the operating mechanism to receive and engage the pin of the inner operating member for operably joining the activating shaft and the inner operating member.

4. A wellhead tool as recited in claim 3, further comprising means for providing automatic self-alignment between the inner operating member and the activating shaft with re-establishing contact between the operating mechanism and plug mechanism to remove the plug mechanism from the conduit of the wellhead assembly.

5. A wellhead tool as recited in claim 4, in which the self-alignment means comprises:

a pair of converging beveled surfaces intersecting the outermost end of the enlarged head end portion of the activating shaft, the beveled surfaces ending at the generally L-shaped slots provided therein so that the pin of the inner operating member is guided directly into the L-shaped slots upon engagement of the inner operating member and the beveled surfaces of the activating shaft to reconnect the operating mechanism to the plug mechanism to disengage the plug mechanism from the conduit of the wellhead assembly and remove it therefrom.

6. In an improved wellhead tool of the type used for removing and replacing a valve on an operating wellhead assembly and having an elongated housing with a fluid coupling on one end mountable with a fluid coupling of a valve on the wellhead assembly, a plug mechanism mountable in a conduit communicating to the valve from the wellhead assembly to temporarily block fluid flow through the conduit, an operating mechanism associated with the housing to displace the plug mechanism through the valve and into the conduit and to releasably operate the plug mechanism in the conduit, the plug mechanism having a resilient sealing member associated with the plug mechanism to temporarily seal off the conduit to prevent communication of pressurized fluid from the wellhead assembly to the valve to be removed, wherein the improvement comprises:

the plug mechanism having a latch means associated therewith to secure the plug mechanism within the conduit of the wellhead assembly against the pressurized fluid existing therein;

the plug mechanism further including a hollow generally cylindrical body member, a seal retaining member longitudinally slidably mounted on one end of the body member, a threaded activating shaft longitudinally fixed within the body member and threadably received within the seal retaining member and extending therethrough, the activating shaft being operable upon rotation in one direction by the operating mechanism to move the seal retaining member toward the body member, the activating shaft being operable upon rotation in the opposite direction by the operating mechanism to move the seal retaining member away from the body member;

the latch means having a latch displacing member mounted on the end of the activating shaft extending through the seal retaining member, and a generally cup-shaped end cap received on the end of the seal retaining member, thereby, enclosing the latch displacing member and forming a latch chamber, the end cap having a plurality of slots formed therein communicating between the latch chamber and the exterior circumference of the plug mechanism, the slots having interior walls which are divergently angled toward the central longitudinal axis of the plug mechanism, the latch chamber having a plurality of ball bearings positioned in a surrounding relationship with the activating shaft and being in a free abutting engagement with the activating shaft at all times so that upon rotation in one direction of the activating shaft the seal retaining member and attached end cap are moved towards the body member and latch displacing member to direct one ball bearing into each slot such that the ball bearings ride or cam along an exterior portion of the latch displacing member, the ball bearings being of a sufficiently small diameter to allow the ball bearings to completely enter the slots and sufficiently large diameter to prevent them from completely exiting the slots exteriorly of the plug mechanism, the ball bearings extending beyond the circumference of the plug mechanism when in the extended position to positively secure the plug mechanism within the conduit of the wellhead assembly, the activating shaft being operable upon rotation in the opposite direction to move the seal retaining member and end cap away from the body member and latch displacing member to allow the ball bearings to recede into the slots and latch chamber, thereby, releasing the plug mechanism from the conduit of the wellhead assembly.

7. An improved wellhead tool as recited in claim 6, wherein:

the operating mechanism has an inner operating member and an independently rotatable outer operating member;

the inner operating member has an inner end which is engageable with the plug mechanism extending beyond an inner end of the outer operating member and has a pin transversely mounted therethrough;

the outer operating member has a pair of diametrically opposed elongated slots formed in an inner end portion thereof with the slots being disposed along the longitudinal axis of the inner operating member and opening at the inner end of the outer operating member;

the body member of the plug mechanism has a pair of diametrically opposed locking keys extending into the hollow portion thereof and secured therein by spring means surrounding the outer circumference of the body member, the locking keys being radially displacable upon insertion of the operating mechanism into the body member and the keys being engageable in the slots of the outer operating member upon rotation of the outer operating member to rotatably secure the outer operating member to the body member;

and the activating shaft has an enlarged head end portion with a central opening longitudinally oriented relative to the longitudinal axis of the operating mechanism and a pair of oppositely facing diametrically opposed generally L-shaped slots opening with the long end of the slots directed toward the operating mechanism to receive and engage the pin of the inner operating member for operably joining the activating shaft and the inner operating member.

8. An improved wellhead tool as recited in claim 6, the improvement further comprising means for providing automatic self-alignment between the operating member and the activating shaft with re-establishing contact between the operating mechanism and plug mechanism to remove the plug mechanism from the conduit of the wellhead assembly.

9. An improved wellhead tool as recited in claim 8, in which the self-alignment means comprises:

a pair of converging beveled surfaces intersecting the outermost end of the enlarged head end portion of the activating shaft, the beveled surfaces ending at the generally L-shaped slots provided therein so that the pin of the operating member is guided directly into the L-shaped slots upon engagement of the inner operating member and the beveled surfaces of the activating shaft to reconnect the operating mechanism to the plug mechanism to disengage the plug mechanism from the conduit of the wellhead assembly and remove it therefrom.

* * * * *

UNITED STATES PATENT AND TRADEMARK OFFICE
CERTIFICATE OF CORRECTION

PATENT NO.  : 4,503,879
DATED       : March 12, 1985
INVENTOR(S) : Kenneth W. Lazarus It is certified that error appears in the above-identified patent and that said Letters Patent is hereby corrected as shown below:

Column 3, line 18, change "200" to -- 20 --.

Signed and Sealed this

Twelfth Day of November 1985

[SEAL]

Attest:

Attesting Officer

DONALD J. QUIGG

Commissioner of Patents and Trademarks